Figure 1:
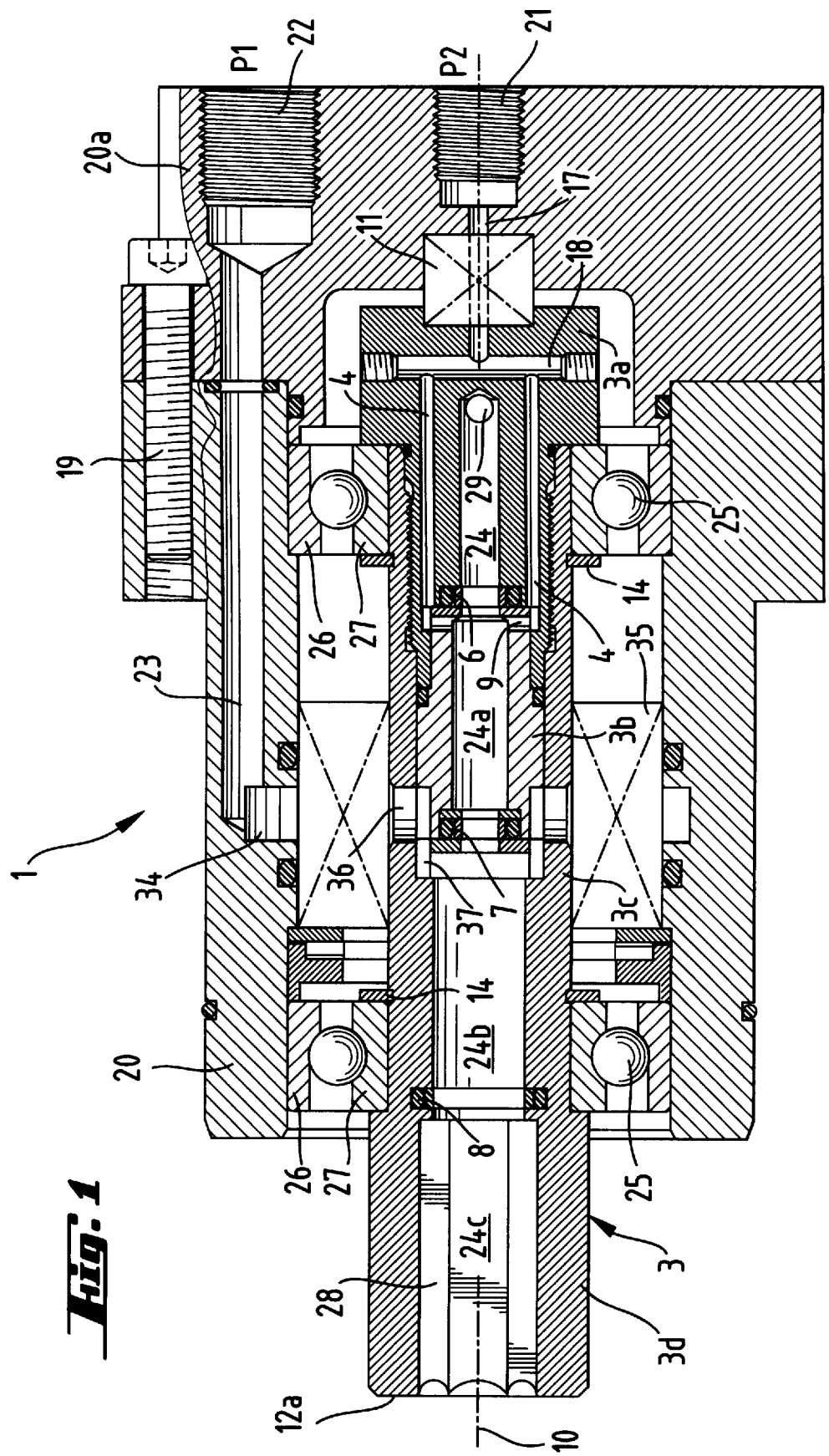

United States Patent [19]
Ott

[11] Patent Number: 6,085,782
[45] Date of Patent: Jul. 11, 2000

[54] DEVICE FOR FLUID TRANSFER

[75] Inventor: Stephan Ott, Wiesbaden, Germany

[73] Assignee: GAT Gesellschaft fur Antriebstechnik mbH, Wiesbaden, Germany

[21] Appl. No.: 09/304,546

[22] Filed: May 4, 1999

[30] Foreign Application Priority Data

May 7, 1998 [DE] Germany .............................. 198 20 362

[51] Int. Cl.[7] .................................................. F16L 27/00
[52] U.S. Cl. ................................ 137/580; 901/22; 901/29
[58] Field of Search ............................. 137/580; 901/22, 901/29

[56] References Cited

U.S. PATENT DOCUMENTS

| | | | |
|---|---|---|---|
| 4,726,397 | 2/1988 | Stich | 137/580 |
| 4,790,699 | 12/1988 | Ringel | 409/231 |
| 4,899,637 | 2/1990 | Caruso | 91/173 |
| 5,240,039 | 8/1993 | Colussi et al. | 137/580 |

*Primary Examiner*—A. Michael Chambers
*Attorney, Agent, or Firm*—Paul and Paul

[57] ABSTRACT

The present invention relates to a device for transferring a fluid from a stationary (20) to a rotating machine part (3) by means of a rotary joint (1), which optionally comprises flat radial, conical or cylindrical transition surfaces, wherein an at least partially tubular connecting rod (2) rotating with the rotating machine part (3) is provided thereon for the purpose of conveying the fluid, which rod (2) extends into the area of the rotary joint (1) and which is axially displaceable with respect to the rotary joint (1). To provide a device with the above-mentioned features, in which a change in the volume of the central feed pipe during a chucking or releasing movement of the connecting rod, which consists of the central feed pipe or contains the latter, is prevented, it is proposed according to the invention that the rotating transition surface of the rotary joint (1) be associated with a media delivery pipe (30) which is disposed with radial play coaxially with respect to the connecting rod (2) of the rotating machine part (3) and overlaps the latter in the axial direction by an amount which is greater than the maximum axial displacement of the rotating connecting rod (2) which occurs during use of the device relative to the co-rotating media delivery pipe (30).

15 Claims, 4 Drawing Sheets

DEVICE FOR FLUID TRANSFER

The present invention relates to a device for transferring a fluid from a stationary to a rotating machine part by means of a rotary joint, which optionally comprises radial flat, conical or cylindrical transition surfaces, wherein a connecting rod rotating with the rotating machine part is provided thereon for the purpose of conveying the fluid, which extends into the area of the rotary joint and which is axially displaceable with respect to the rotary joint.

A device of this type is known from German Patent Application No. 197 51 834. In this known device, a double rotary joint is provided for supplying two separate fluids, wherein a central feed extends exclusively in the axial direction and wherein the transition surfaces constitute small diameter sealing surfaces positioned in a radial plane, while a second fluid feed extends in the radial direction from the outside inwards at a distance from the transition surfaces of the central fluid feed. Consequently, a central, double-walled pipe is provided on the rotating machine part, the inner pipe portion of which is connected with the central fluid supply duct of the rotary joint, while the outer pipe portion is connected with the radial feed ducts of the rotary joint. The device described in DE 197 51 834 A1 is particularly provided for so-called minimal quantity lubrication, in which a very small quantity of oil is fed centrally into a mixing chamber provided in a machine tool spindle in the vicinity of a tool head, while air feed is effected coaxially and radially externally with respect to said oil feed. Thorough mixing of the air and oil forms a fine oil mist in the mixing chamber in the immediate vicinity of the tool holding fixture in the spindle, and this mixture is then conveyed through corresponding bores in a tool into the working area of the tool. Only extremely small quantities of oil are supplied, whereas the quantities of air are comparatively large. At the same time, the supply of oil mist to the working area of a tool, such as a drill or milling tool for example, must be very even, without interruption and in the form of very small, well dispersed oil droplets, so that adequate lubrication and a corresponding reduction in the friction arising during machining of a workpiece are obtained nonetheless despite the minimal quantity of oil supplied. Otherwise, the frictional heat arising would very rapidly lead to destruction of the tool. The tendency to use tools and machine tools which operate at ever higher speeds makes this even more relevant. This so-called minimal quantity lubrication has the advantage that, in contrast to the conventional, widespread use of an oil emulsion, only very small quantities of lubricant are used. The emulsions used hitherto have, on the other hand, to be collected by relatively complex means, cleaned at least roughly and disposed of or reprocessed for re-use.

Completely dry machining without any lubricant is possible only at low speeds or with low material abrasion rates. It goes without saying that, in the case of such dry machining, no fluid has to be fed through the machine tool spindle and the tool, such that this type of machining may here be left out of consideration.

In the case of minimal quantity lubrication, the problem arises, as mentioned above, of supplying a constantly uniform oil mist in steady and even manner to the working area of the tool, which, inter alia, is the reason why an appropriate mixing chamber for producing the oil mist was moved into the lower area of the spindle into the vicinity of the tool holding fixture, in order that production of the oil mist might wait until then, so that said oil mist might undergo as little change as possible, e.g. droplet separation or droplet agglomeration, on the remaining journey to the working area of the tool.

The oil quantities required for this purpose are, for example, of the order of 20 ml per hour. The supply units and central feed lines, together with the central rotary joint, are of correspondingly small dimensions. As far as the rotary joint is concerned, this has the additional advantage that sliding sealing faces with relatively small diameters may be used, such that the spindle speeds at which the rotary joint or the machine tool as a whole operate may be very high, while the tightness and operability of the central rotary joint continue to be ensured.

In the case of machine tools in which tool changes are carried out automatically by hydraulic or pneumatic means, a central connecting rod is conventionally used, which moves in the axial direction in order to actuate corresponding retaining and clamping members located on the tool holding fixture of the machine tool spindle. Typically, such a connecting rod is preloaded in the chucking direction of the tool holding fixture by a set of springs, hydraulic or pneumatic actuation resulting in axial movement of the connecting rod against the spring force, by means of which the tool is released by the chucking device.

In order to be able simultaneously to feed fluid and appropriately actuate the connecting rod on the spindle of a machine tool, an appropriate transfer duct is constructed in the connecting rod itself, i.e. the connecting rod is itself in the form of a pipe which at the same time serves as a central feed duct. If various fluid ducts are provided, the connecting rod accordingly generally takes the form of a multi-walled pipe, such that the number of feed ducts may be increased accordingly. However, in the context of the present application the term "connecting rod" is not restricted to the above-described meaning, but rather comprises in general any tubular member through which fluid may be conveyed from a rotary joint or to a rotary joint and which, moreover, may be axially displaced with respect to the rotary joint or the sliding sealing faces of the rotary joint.

Where central fluid supply is concerned, the problem arises that the volume in the overall supply duct varies between the rotary joint and the lower end of this duct merely through axial movement of the central pipe. Since it is not the diameter of the feed ducts which changes but rather the effective length, as a result of the axial movement of this pipe in the rotary joint, the volume varies by an amount corresponding to the cross section of the central feed duct multiplied by the axial displacement path of the central pipe. While this does not constitute a problem as long as the appropriate feed duct is open on one or both sides, considerable problems may arise if the feed duct is closed at both ends. In the case of minimal quantity lubrication, the lower end of the feed duct is closed by the mixing chamber or a corresponding inlet valve in the area of the mixing chamber. At the other end, of course, central oil feed is also stopped during a tool change, during which the axial movement of the connecting rod or the central pipe also occurs. The sudden release of the connecting rod or the central feed pipe, which generally has the effect of increasing the effective volume of the central feed duct, may then result in a sudden vacuum in this duct, resulting either in an intake of air through leaks or partial degassing of the oil contained therein. This means that air bubbles arise in the oil feed duct, whereby production of an oil mist in the mixing chamber may be interrupted. This may lead very rapidly to considerable tool wear.

In other instances where a central fluid feed duct is provided, however, the pressure surges related to the chucking or releasing movement of the central connecting rod constructed as a transfer pipe may lead to operating problems or damage to individual components. In particular, leakages may arise and sealing surfaces may be damaged.

With regard to this prior art, the object of the present invention is to provide a device with the above-mentioned features, in which a change in the volume of the central feed pipe during a chucking or releasing movement of the connecting rod, which consists of the central feed pipe or contains the latter, is prevented.

This object is achieved in that the rotating transition surface of the rotary joint is associated with a pipe portion which is disposed with radial play coaxially with respect to the pipe of the rotating machine part and overlaps the latter in the axial direction by an amount which is greater than the maximum axial displacement of the rotating pipe which occurs during use of the device relative to the co-rotating pipe portion, wherein the radially outer one of the two pipe members has substantially axially extending transfer ducts in its wall and wherein the inner one of the two pipe members is closed at its end overlapping the outer pipe member, in that two seals between pipe and pipe portion are provided in the overlap area at an axial distance from each other which is likewise greater than the above-mentioned, maximum relative axial displacement, in that both the pipe portion and the pipe each comprise at least one bore in the area between the seals, these bores being for the passage of the fluid either from the ducts of the radially outer pipe member or from the central lumen of the inner pipe member into the space formed between these pipe members by the radial play and thence into the respective other tubular portion or the transfer duct.

The pipe and pipe portion are here also given the generic designation "pipe member". In order to close the end of the inner pipe member located in the overlap area, a central axially extending transfer duct is dispensed with. Instead, a space is created between the walls of two pipe members, which space is delimited in both axial directions by seals, and the pipe members each comprise radial bores in this area, such that fluid may pass from one thereof into the space and thence into the other thereof. The pipe members may be moved relative to one another in the axial direction, wherein the radial bores in the two pipe elements always remain inside the space delimited by the seals between the inner and outer pipe members. It is then possible either for the pipe portion provided on the rotary joint to be positioned radially inside the pipe of the rotating machine part or on the other hand for the pipe portion provided on the rotary joint and associated with the co-rotating sealing or transition face of the rotary joint to be located radially outside a thinner central pipe, which is provided on the rotating machine part and extends into the pipe portion of the rotary joint. This latter variant is preferred and forms the main basis for the following description of further preferred features, wherein these features may by analogy be transferred without difficulty to the reverse radial arrangement (pipe portion radially inside and pipe radially outside). The radially outer one of these pipe members comprises axial transfer ducts in its wall, which are connected with the space between the inner and outer pipe members via the radial bore in the area between the seals.

Displacement of the radially inner pipe member relative to the radially outer pipe merely then merely has the effect of displacing the two radial bores relative to each other in the axial direction in the space between the seals, without changing in any way the volume of the central pipe, which is closed at its end projecting into the pipe portion. At the same time, the volume of the space and of the transfer ducts provided in the walls of the outer pipe member does not change in any way either, since this volume is not affected by movement of the central pipe relative thereto. The only things to change are the wall portions, which respectively form the inner wall and the outer wall of the space between the inner and outer pipe members, since one of these cylindrical walls is displaced relative to the other and relative to the seals, which are appropriately fixed to one of these two walls, so that they retain their fixed axial spacing.

The central cavity of the pipe portion, provided that it does not delimit the above-mentioned space, defines merely a locating gap for the free end of the central pipe, but is not connected to the transfer gap. In particular, this central cavity may also be connected with the external environment, such that the pressure may thereby be relieved, which also relieves the seals which delimit the space.

In the preferred embodiment of the invention, in which the pipe portion is arranged on the rotary joint and its internal diameter is greater than the external diameter of the pipe, which rotates with the rotating machine part and extends in sealed manner into the pipe portion of the rotary joint, provision is additionally made for this inner pipe of the rotating machine part to be surrounded coaxially by an outer pipe axially outside the area of overlap with the pipe portion of the rotary joint and to be connected with said outer pipe. A further feed duct for a second fluid is then defined between the inner and outer pipes. In this form, the device is particularly suitable for use in conjunction with so-called minimal quantity lubrication.

In the preferred embodiment of the invention, the outer pipe also has a portion, the outer surface of which is uniformly hexagonal in shape. The inner and outer pipes preferably form part of the spindle of a machine tool and in particular the connecting rod thereof for pneumatic or hydraulic actuation of a chuck.

The pipe portion provided on the rotary joint and encircling the inner pipe, may, moreover, be so constructed as also to have a further portion which encircles the outer pipe and, furthermore, a hexagon socket area which may enter into engagement with a hexagon insert area on the outer pipe of the rotating machine part, if, as preferred, the pipe portion of the rotating machine part is composed of a plurality of parts.

Figure 2:
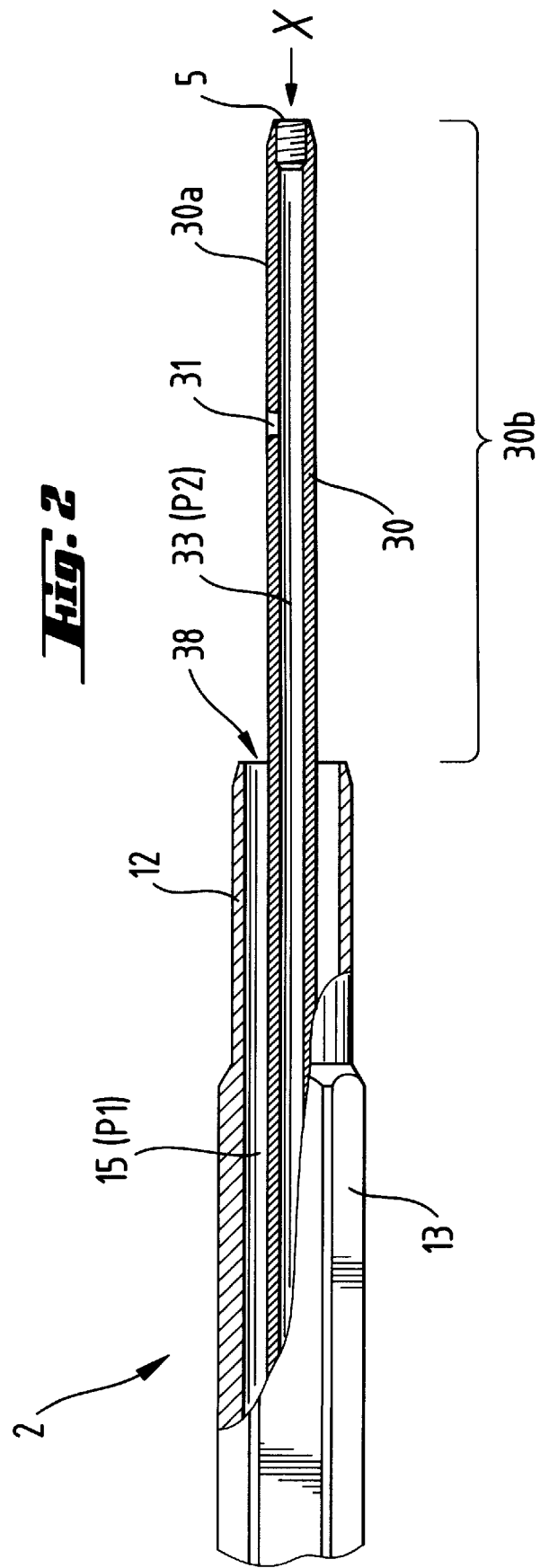
Figure 3:
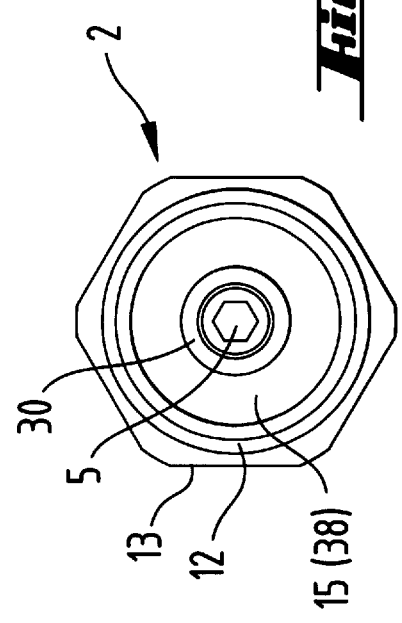
Figure 4:
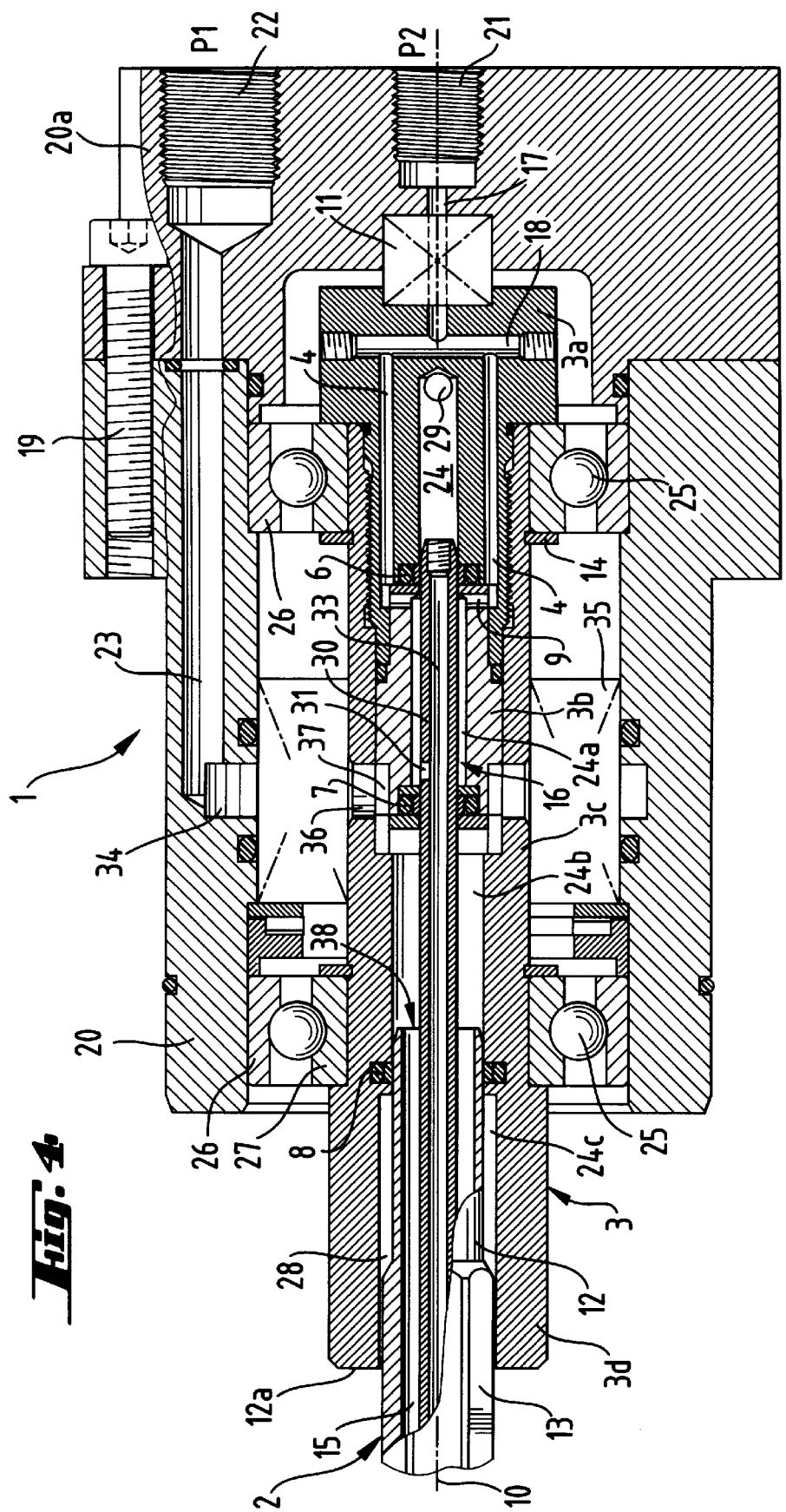
Figure 5:
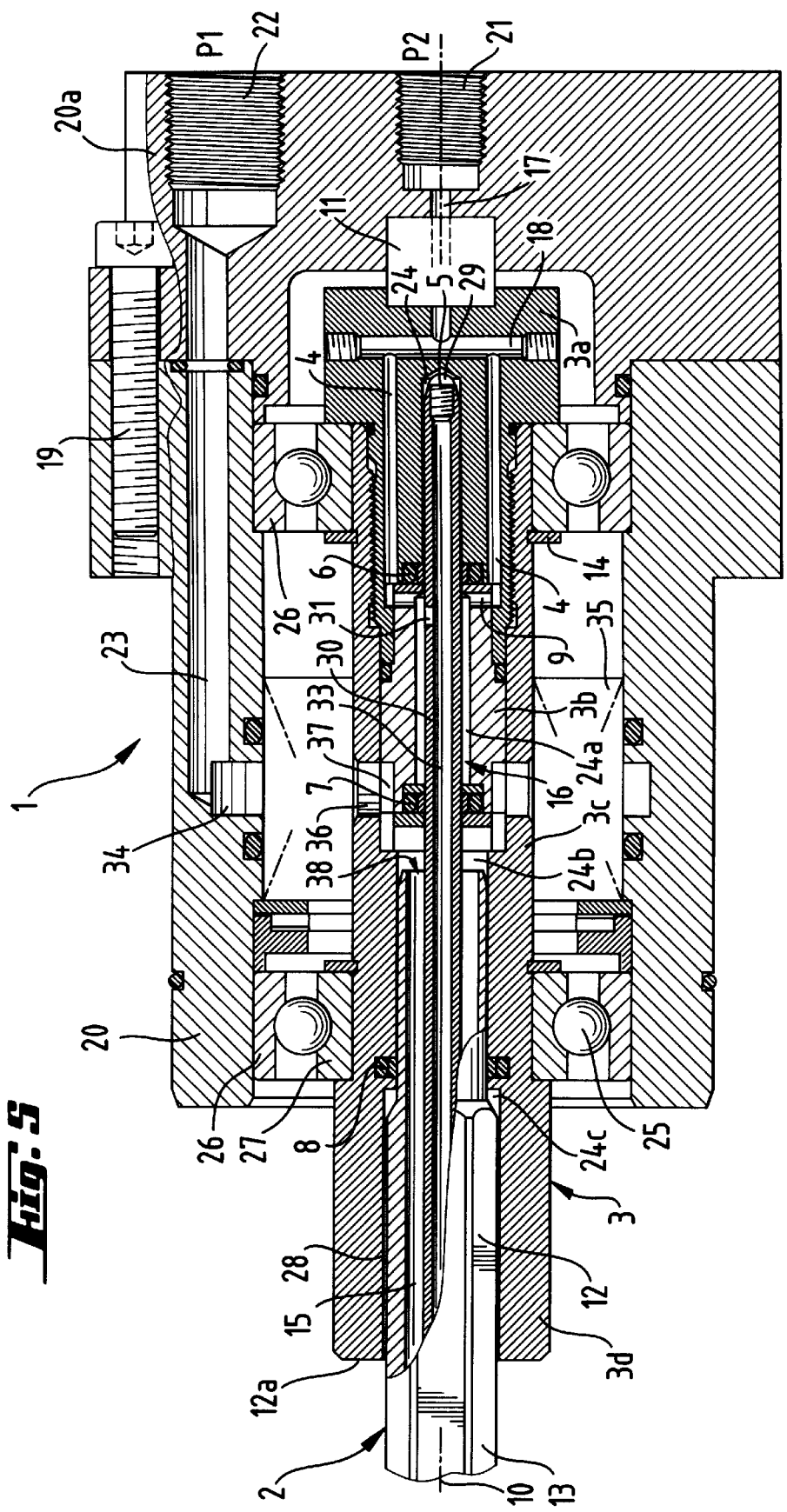

Further advantages and features of and possible uses for the present invention will be revealed by the following description of a preferred embodiment and the associated Figures, in which:

FIG. 1 shows an axial section through a rotary joint,

FIG. 2 shows the connecting rod of a machine tool, constructed as a double-walled pipe, which may be inserted into the rotary joint according to FIG. 1, FIG. 3 is a plan view of the connecting rod according to FIG. 2 in the direction of the arrow "X", FIG. 4 shows the connecting rod in a first end position (tool change) in a rotary joint according to FIG. 1, and FIG. 5 shows the connecting rod in a second end position (tool chucked) in a rotary joint according to FIG. 1.

The description of FIG. 1 makes reference at the same time to FIGS. 4 and 5.

The rotary joint 1 consists essentially of a stationary housing 20, in this instance comprising two parts, with a cover 20a. The housing 20 and cover 20a are connected together by screws 19. Connections 21 and 22 for supplying media under the pressures P2 and P1 respectively are provided in the cover 20a. The connection 21 forms a central feed line, while the connection 22 forms a non-central feed line. Specifically, the central connection 21 is provided for supplying very small quantities of lubricant, while the connection 22 is provided for supplying compressed air.

The second essential element of the rotary joint, after the external, stationary housing 20, is the inner rotatable part 3, which substantially comprises four subsections 3a, 3b, 3c and 3d. The aspects of the rotating part 3 which are of greatest importance to the invention are primarily to be found in subsections 3a and 3b of the rotating part. The rotatable part 3 is mounted rotatably about the central axis 10 by means of ball bearings 25, wherein the respective outer ring 26 is connected firmly to the inner wall of the housing 20 and the inner ring 27 is connected firmly to subsection 3c. The ball bearings 25 are positioned by means of circlips.

The sealed area of transition between the stationary housing 20 or the cover 20a and the rotating part 3 is formed by a rotary transition seal 11, not described in any more detail, which may for example comprise sliding sealing faces and is indicated only schematically.

As shown in FIG. 3, the rotatable part 3 comprises a central bore, which takes the form of a four-step stepped bore comprising a front bore 24, the central bores 24a and 24b and the rear bore 24c. The rear bore 24c additionally comprises a hexagon socket 28. The stepped bores 24 to 24c are associated with the respective subsections 3a to 3d. At the points of transition between subsections 3a and 3b, 3b and 3c, and 3c and 3d there are provided seals 6, 7 and 8. In the context of the present description, the terms "front" and "rear" are to be understood as follows: the components of the individual parts designated "front" are those lying to the right in FIGS. 1, 2, 4 and 5, while "rear" is used to designate the left-hand ends of the respective parts.

The connection 21, as the central fluid feed line, is connected to the radial bore 18 by the bore 17 and the rotary transition seal 11. A further radial bore 9 is disposed at the upper end of the central bore 24a, wherein the connection to the radial bore 18 is produced by ducts 4 extending parallel to the front bore 24.

As the drawing in FIG. 1 further shows, the front bore 24 takes the form of a blind hole and is provided in the closed end area with a pressure relief bore 29, the purpose of which will be explained in more detail later.

The connecting rod 2 according to FIG. 2 is described below.

The connecting rod 2 is likewise of stepped construction and so dimensioned that it may be inserted into the central stepped bore in the rotatable part 3 and moved axially therein. In the left-hand half of the drawings, the connecting rod 2 is shown in section.

The connecting rod 2 consists of a media delivery pipe 30, which is arranged concentrically in an outer pipe 12 and comprises a hexagon insert area 13. As FIG. 3 shows, the media delivery pipe 30, which is firmly connected with the outer pipe 12, is arranged centrally therein, such that an annular space 15 is formed. A radial bore 31 is arranged approximately centrally in the wall 30 of the media delivery pipe 30 between the upper closed end 5 of the media delivery pipe 30 and the upper end 12a of the outer pipe 12.

As FIG. 4 shows, the projecting area 30b of the media delivery pipe 30 corresponds to the entire length of the bore portions 24 and 24a or the subsections 3a and 3b, i.e. the length of the end area 30b of the pipe 30 projecting beyond the outer pipe 12 is greater than the axial distance between the seals 6, 7 at least by the axial displacement path of the connecting rod 2.

Taking as basis FIGS. 4 and 5, which show two different operating positions of the connecting rod 2, the function and method of operation of the device for fluid transfer will be described in more detail.

The projecting portion 30b of the media delivery pipe 30 and the axial distance between the seals 6, 7 are such that the annular space 16 surrounding the pipe 30 is sealed in the central area 3b by the seals 6, 7.

The media delivery pipe 30 of the connecting rod 2 is guided substantially tightly in the front bore 24. When the device is in operation, the entire connecting rod 2 rotates together with the rotatable part 3.

The fluid exits from the connection 21 through the central bore 17 and through the rotary joint 11, then into the radial bore 18 and thence into the ducts 4.

FIG. 4 shows the "released" end position of the connecting rod 2 in the bore 24, while FIG. 5 shows the "chucked" end position of the connecting rod 2 in the bore 24. As may be seen, the radial bore 31 is arranged in the pipe 2 in such a way that it remains constantly between the seals 6 and 7, i.e. in the area 3b of the central bore 24b, irrespective of the operating status ("released" or "chucked"). Lubricant, oil or any other fluid located in the annular space 16 may flow through the bore 31 into the inner bore 33 in the pipe 2 or vice versa in any position between these two end positions.

Of particular note in this regard is the fact that the total volume of all the oil feed lines, starting from the feed line 21 and taking in the bores 17, 18, 4 and 9, the annular space 16 and the bore 31, including the inner bore 33 in the pipe 2, does not vary when the pipe 2 is moved between its end positions shown in FIGS. 4 and 5.

Because the upper, closed end 5 of the pipe 2 moves in the annular space 16 of subsection 24a substantially in the manner of a piston in a cylinder, a pressure relief bore 29 is provided. This produces a connection between the bore 24 and the external environment, such that, when the pipe 2, closed at its end 5, is moved in the annular space 16 of the bore 24a or of the bore 24 (FIG. 5), it is neither possible for pressure to build up nor for a vacuum to arise. The seals 6, 7 ensure secure sealing of the annular space 16, which is filled with lubricant, with respect to the bore 24 and 24b.

Because, as described above, the volume of the entire central feed system does not vary during axial movement of the connecting rod 2, no air or gas bubbles are able to form in this feed system, and a continuous supply of lubricant is thus ensured.

Air is also supplied in parallel with the central oil feed via the connection 21 and radially externally thereof. This air is fed through the connection 22, the axially extending duct 23 adjacent thereto and the annular duct 34. The annular duct 34 is connected with a further, likewise only schematically illustrated rotary joint member 35. The compressed air passes therefrom into the radial bore 36 arranged in the rotating part 3, the axial annular space 37 in the subsection 24a and the bore 24b. The outer pipe 12 is open at the end at 38, such that the compressed air (or other fluid) conveyed in the bore 24b enters into the outer pipe 12 at the end at 38 and may be conveyed through the annular space 15 further backwards to its destination, a mixing nozzle which is not shown. The seal 8 seals the outer pipe 2 with respect to the bore 24c. The length of this portion, the position of the seal 8 and the projection 30b of the pipe 2 with respect to the outer pipe 12 are so dimensioned that the open end 38 of the outer pipe 12 always, i.e. in both axial end positions of the connecting rod 2, lies in the subsection above the seal 8.

The hexagon insert 13 engages frictionally and form-fittingly in the corresponding hexagon socket 28 of subsection 3c, with respect to the direction of rotation, and thereby ensures common rotation of the rotating part 3 and the connecting rod 2. At the same time, these hexagonal portions 13, 28 are of such lengths that they remain in form-fitting engagement with each other in both axial end positions of the connecting rod 2.

What is claimed is:

1. A device for transferring a fluid from a stationary machine part to a rotating machine part by means of a rotary joint, the rotary joint comprising at least one transition surface and having a pipe portion, wherein an at least partially tubular connecting rod rotating with the rotating machine part is provided thereon for the purpose of conveying the fluid, said rod extending into the area of the rotary joint, the connecting rod being axially displaceable with respect to the rotary joint and having a maximum axial displacement which occurs during use of the device, the connecting rod and the rotating machine part each comprising pipe members, characterised in that the rotating transition surface of the rotary joint is associated with a media delivery pipe which is disposed with radial play coaxially with respect to the connecting rod of the rotating machine part and overlaps the connecting rod in the axial direction by an amount which is greater than the maximum axial displacement of the rotating connecting rod which occurs during use of the device relative to the co-rotating media delivery pipe, wherein the radially outer one of the two pipe members, has at least one substantially axially extending fluid transfer duct in its wall and wherein the inner one of the two pipe members is closed at its end projecting into the outer pipe member, in that two seals between the connecting rod and the pipe portion are provided in the overlap area at an axial distance from each other which is likewise greater than the above-mentioned, maximum relative axial displacement, in that both the pipe portion and the connecting rod each comprise a bore in the area between the seals, these bores being for the passage of the fluid either from the axial ducts of the radially outer pipe member or from the inside of the inner pipe member into the space formed between these pipe members by the radial play and thence into the respective other pipe member.

2. A device according to claim 1, characterised in that in the overlap area the internal diameter of the media delivery pipe is greater than the external diameter of the connecting rod in the area overlapping the media delivery pipe.

3. A device according to claim 2, characterised in that the rotatable part consists of a plurality of subsections.

4. A device according to claim 2, characterised in that the media delivery pipe of the rotating machine part is surrounded coaxially by an outer pipe axially at a distance from the end area thereof overlapping the pipe portion and is connected firmly with said outer pipe.

5. A device according to claim 4, characterised in that the rotatable part consists of a plurality of subsections.

6. A device according to claim 4, characterised in that the outer pipe comprises a hexagon insert area at a distance from its open end, wherein the distance corresponds at least to the maximum axial displacement.

7. A device according to claim 6, characterised in that the media delivery pipe and the outer pipe constitute parts of a machine tool spindle.

8. A device according to claim 6, characterised in that the rotatable part consists of a plurality of subsections.

9. A device according to claim 4, characterised in that the media delivery pipe and the outer pipe constitute parts of a machine tool spindle.

10. A device according to claim 9, characterised in that the media delivery pipe and the outer pipe constitute a connecting rod for actuating a machine tool chuck.

11. A device according to claim 10, characterised in that the rotatable part consists of a plurality of subsections.

12. A device according to claim 9, characterised in that the rotatable part consists of a plurality of subsections.

13. A device according to claim 9, characterised in that the rotatable part consists of a plurality of subsections.

14. A device according to claim 13, characterised in that the rotatable part comprises a hexagon socket area at its outer end.

15. A device according to claim 1, characterized in that the at least one transition surface is selected from flat, radial, conical and cylindrical transition surfaces.

* * * * *